US006370282B1

United States Patent
Pavley et al.

(10) Patent No.: US 6,370,282 B1
(45) Date of Patent: Apr. 9, 2002

(54) METHOD AND SYSTEM FOR ADVANCED TEXT EDITING IN A PORTABLE DIGITAL ELECTRONIC DEVICE USING A BUTTON INTERFACE

(75) Inventors: John F. Pavley, Cupertino; Eric C. Anderson, San Jose, both of CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/261,947

(22) Filed: Mar. 3, 1999

(51) Int. Cl.[7] .................................................. G05K 9/03
(52) U.S. Cl. ....................................... 382/311; 345/327
(58) Field of Search .............................. 382/311, 310, 382/318, 312, 319, 186, 187, 189, 181, 313, 315, 314; 345/327, 352, 339, 353, 141, 145, 156

(56) References Cited

U.S. PATENT DOCUMENTS

| | | | | |
|---|---|---|---|---|
| 5,339,392 A | * | 8/1994 | Risberg et al. ............ | 395/161 |
| 5,701,500 A | * | 12/1997 | Ikeo et al. ................. | 395/779 |
| 6,011,546 A | * | 1/2000 | Bertram .................... | 345/327 |
| 6,011,554 A | * | 1/2000 | King et al. ................ | 345/352 |

\* cited by examiner

*Primary Examiner*—Andrew W. Johns
*Assistant Examiner*—Seyed Azarian
(74) *Attorney, Agent, or Firm*—Sawyer Law Group LLP

(57) ABSTRACT

A method and system for implementing an efficient alphanumeric text entry interface for a portable digital electronic device. A first entry area and a second entry area are generated for display on the incorporated display screen of a digital electronic device. The first and second areas are configured to display alphanumeric characters. A cursor is generated for selecting from among the various alphanumeric characters displayed in the first area and the second area. The cursor is operable to highlight a currently selected alphanumeric character such that the currently selected alphanumeric character is visible and easily distinguishable to the user. The movement of the cursor is controlled with the four way controller built into the digital electronic device. The four way controller is adapted for easy actuation by the user, wherein its movements are coordinated with the movement of the cursor on the display. The user controls the movement of the cursor among the alphanumeric characters within the first area and second area and controls the movement of the cursor between the first area and second area. A persistent selection highlight is generated for an alphanumeric character previously selected by the cursor, such that as the cursor is moved between the first area and second area, the previously selected alphanumeric character remains visible to the user. The user is able to selectively process the currently selected alphanumeric character or the previously selected alphanumeric character in accordance with the user's actuation of an input control built into the digital electronic device.

27 Claims, 12 Drawing Sheets

METHOD AND SYSTEM FOR ADVANCED TEXT EDITING IN A PORTABLE DIGITAL ELECTRONIC DEVICE USING A BUTTON INTERFACE

FIELD OF THE INVENTION

The field of the present invention pertains to input output systems for portable hand held digital electronic devices. More particularly, the present invention relates to a method and system for efficient alphanumeric input and output for hand-held digital electronic devices.

BACKGROUND OF THE INVENTION

There are many different kinds of handheld digital electronic devices. Many devices incorporate displays for implementing input and output with a user. The displays depict the text entered by the user and also depict graphical output of the electronic device.

Different electronic devices from different manufacturers use different means for inputting alphanumeric information into the device. Depending upon the type of device and its characteristics (e.g., size, type of display, intended use, and the like), some input means are more advantageous than others. For example, some devices lend themselves to the incorporation of some type of miniature keyboard (e.g., a "Palm sized" personal computer), while other types of devices require alternative alphanumeric input means (e.g., a portable digital camera).

For example, in the case of a digital camera, while many types of digital cameras are equipped with a liquid crystal display (LCD) or other type of display screen, there's currently no sufficiently simple, intuitive way for a user to enter substantial amounts of text directly into the camera. While the incorporation of an LCD allows the digital camera to be easily controlled and manipulated and also provides an intuitive and easily used method for displaying device status, operating mode, stored images, etc. to the user, the necessarily small size of the LCD limits its utility with regard to the entering of substantial amounts of text. In addition to the small LCD size, the available area of the body of the digital camera that can be used for the inclusion of buttons, switches, mode dials, etc., is limited.

For example, in the case of LCD equipped digital cameras, in addition to an LCD, the cameras also typically include a number of buttons, switches, and dials for configuring the operating modes of the camera, navigating between images in play mode, and the like. For example, most digital cameras include buttons (e.g., two buttons labeled "−" and "+") that enable a user to navigate or scroll through captured images. One or more of the buttons could be implemented as software programmable buttons (e.g., "softkeys"). While this type of interface is designed to be very efficient at interfacing the user with the capabilities of the digital camera, it has proven to be very cumbersome when used to enter substantial amounts of text directly into the camera.

One prior art method used for alphanumeric text entry involves the graphical depiction of a "selection wheel" on the display of the digital camera wherein the selection wheel determines which alphanumeric character is selected for actuation. Two or more buttons are used to "scroll" the selection wheel among the included alphanumeric characters in order to "highlight" the particular character of interest (e.g., when the particular character of interest is highlighted beneath a "selection window" overlaid on top of the selection wheel). Once the character of interest is highlighted, a SoftKey or other button is used to select, or actuate, the highlighted character, thereby entering it into, for example, a line of text being generated on the display.

Prior art FIG. 1A shows a diagram of a selection wheel type of text entry display 101. Display 101 graphically depicts an alphanumeric selection wheel 102, a text entry area 103, scroll indicators 105 and 106, and a highlight window 107. Softkeys 110–112 are depicted at the bottom of display 101. As described above, the user enters text into text entry area 103 by using scroll indicators 105 and 106 to scroll selection wheel 102 (e.g., up or down) until the desired character appears under highlight window 107. Entered text appears within the text entry area 103, with each successive character appearing above a cursor 115. The scroll indicators are actuated via softkeys 110 and 111. The highlighted character is selected via softkey 112. In this manner, the user enters the desired text, scrolling and selecting the appropriate characters as they appear underneath the highlight window 107, incrementally generating the desired text as it appears in text entry window 103.

Another prior art method involves the depiction of a standard "QWERTY" keyboard on the display of the electronic device (e.g., a handheld personal digital assistant) wherein one or more softkeys/buttons determine which alphanumeric character is highlighted and whether the highlighted character is selected or actuated. For example, in the case of a touch screen equipped PDA (personal digital assistant), in some cases, the user actually "types" out the desired text information by touching characters of interest with a stylus, thereby generating text on the display, character by character. The keys of the keyboard representation are touched with the stylus in order to highlight particular alphanumeric characters. A backspace key is often depicted to ease the task of editing the text. An "entered text" area is often depicted which shows the current text being edited. Use of the stylus allows text being edited in the text area to be highlighted or otherwise manipulated by the user. Other keys are included for entering various types of symbols or other special characters.

Prior art FIG. 1B shows a diagram of a touch screen keyboard depiction type of text entry display 121. Display 121 graphically depicts a text entry area 122, a keyboard area 123, and editing keys 124–126. As described above, using the keyboard depiction, the user enters text into the text entry area 122 by touching desired characters depicted within keyboard area 123 with a separate stylus (not shown). Text is displayed within the text entry area 122 as it is entered by the user. Editing keys 124–126 (e.g., enter, backspace, and delete) are used to edited text displayed in the text entry area 122. Using the keyboard depiction, the user enters the desired text, typing in the desired text one character at a time with the stylus.

Both of the above methods present problems for the user. In the case of the selection wheel method, using a graphically depicted selection wheel in conjunction with one or more buttons on the digital camera is not particularly intuitive to a user. For example, the location of numerical characters on the selection wheel with respect to the text characters is not immediately obvious to a user. Typically, the numerical characters (numbers) are located either before or after the text characters (e.g., after the last alphabetical character "Z"). Their location and the means for accessing them is often not intuitive. Further, once the numeric characters are accessed, often the manner in which individual numeric characters are accessed is counter intuitive. For example, whereas one softkey/button is used to "move" the selection wheel up or down to select text characters earlier or later in the alphabet, the same softkey/button could use multiple different schemes to access the numerical characters, such as, for example, whether higher numerical characters are selected on the selection wheel by moving the softkey/button up or down to move the selection wheel up or down. Another problem is the fact that the user is required to traverse several steps in order to input text, which can make inputting large amounts of text (e.g., such as a meaningful description of a complex scene) tedious and frustrating.

In the case of the miniature QVWERTY keyboard representation, graphically depicting all of the keys of the keyboard within the limited size of the touch screen makes the individual keys of the keyboard quite small. This leads to problems wherein the user inadvertently selects the incorrect alphanumeric character. A important disadvantage of this system is the fact that it requires the use of a stylus and it requires the inclusion of a touch screen in the digital camera. The stylus is an extra piece of hardware which must be maintained by the user (e.g., not be lost, broken, etc.). The touch screen is an expensive piece of hardware which must be included in each electronic device, increasing unit cost accordingly.

Thus, what is required is a way of eliminating the requirement for a separate stylus and the inclusion of an expensive touch screen. What is required is a way of entering text into a digital camera which is intuitive and efficient for entering larger amounts of text. What is required is an efficient user-friendly method for entering text into a small handheld electronic device, such as a digital camera, which does not include a keyboard, mouse, stylus, or touch screen, or the like. The required method should offer a user-friendly method of entering text even though the display of the handheld device may be quite small. The present invention provides a novel solution for the above requirements.

SUMMARY OF THE INVENTION

The present invention implements an efficient alphanumeric text entry interface for portable digital electronic devices. The system of the present invention implements a keyboard metaphor for text entry while eliminating the requirement for a separate stylus and an expensive touch screen. The present invention provides a text entry scheme which is intuitive and efficient for entering substantial amounts of text. The system is efficient and user-friendly, allowing a user to efficiently enter text into a small handheld electronic device (such as a digital camera) that does not include a keyboard, mouse, stylus, or touch screen, or the like.

In one embodiment, the present invention is implemented as a method and system for efficient alphanumeric text entry interface for a digital camera-type portable electronic device. A first and second entry area, a text entry area and a keyboard area, are generated for display on the incorporated display screen of the digital camera. The text entry area and the keyboard area are both configured to display alphanumeric characters. A target cursor is generated for selecting from among the various alphanumeric characters displayed in the text entry area and the keyboard area. The target cursor is operable to highlight a currently selected alphanumeric character such that the currently selected alphanumeric character is visible and easily distinguishable to the user. The movement of the cursor is controlled with the four way controller built into the digital camera. The four way controller is adapted for easy actuation by the user, wherein its movements control the movement of the cursor on the display. The user controls the movement of the cursor among the alphanumeric characters within the text entry area and keyboard area and controls the movement of the cursor between the two.

A persistent selection highlight is generated for an alphanumeric character previously selected by the target cursor, such that as the cursor is moved between the text entry area and keyboard area, the previously selected alphanumeric character remains visible to the user. The user is able to selectively process the currently selected alphanumeric character or the previously selected alphanumeric character, such as, for example, by entering the character into a string of text being generated to describe a previously captured image, in accordance with the user's actuation of an input control (e.g., one or more softkeys) built into the digital camera. In so doing, the digital camera implements a keyboard metaphor for text entry while eliminating the requirement for a separate stylus and an expensive touch screen, while remaining intuitive and efficient for entering text.

BRIEF DESCRIPTION OF THE DRAWINGS

The present invention is illustrated by way of example and not by way of limitation, in the figures of the accompanying drawings in which like reference numerals refer to similar elements and in which.

Prior art

Prior art

DETAILED DESCRIPTION OF THE INVENTION

The present invention relates to a method and system for advanced text editing in a portable digital electronic device using a button interface. The following description is presented to enable one of ordinary skill in the art to make and use the invention and is provided in the context of a patent application and its requirements. Although the present invention, a method and system for advanced text editing in a digital imaging device using a button interface, is described in part within the context of a digital camera, various modifications to the preferred embodiment will be readily apparent to those skilled in the art and the generic principles herein may be applied to other embodiments. That is, any digital device which processes, displays and/or prints digital images, icons and/or other items, could incorporate the features described hereinbelow and that device would be within the spirit and scope of the present invention. Thus, the present invention is not intended to be limited to the embodiment shown but is to be accorded the widest scope consistent with the principles and features described herein.

The present invention implements an efficient alphanumeric text entry interface for portable digital electronic devices, by implementing a keyboard metaphor for text entry and eliminating the requirement for a separate stylus and an expensive touch screen, as used in several prior art devices. The text entry method of the present invention is intuitive and efficient for entering substantial amounts of text. This greatly aids the utility of small handheld electronic devices, where the available space for implementing a user interface is limited. The system is powerful, efficient, and user-friendly, allowing a user to efficiently enter substantial amounts of text into a small handheld electronic device, such as, for example, a digital camera, that does not include a keyboard, mouse, stylus, or touch screen, or the like.

The text entry method to the present invention can implemented in a variety of types of portable digital electronic devices. In the context of the discussions which follow, the text entry method of the present invention is described as implemented in a portable digital camera.

Figure 1A:
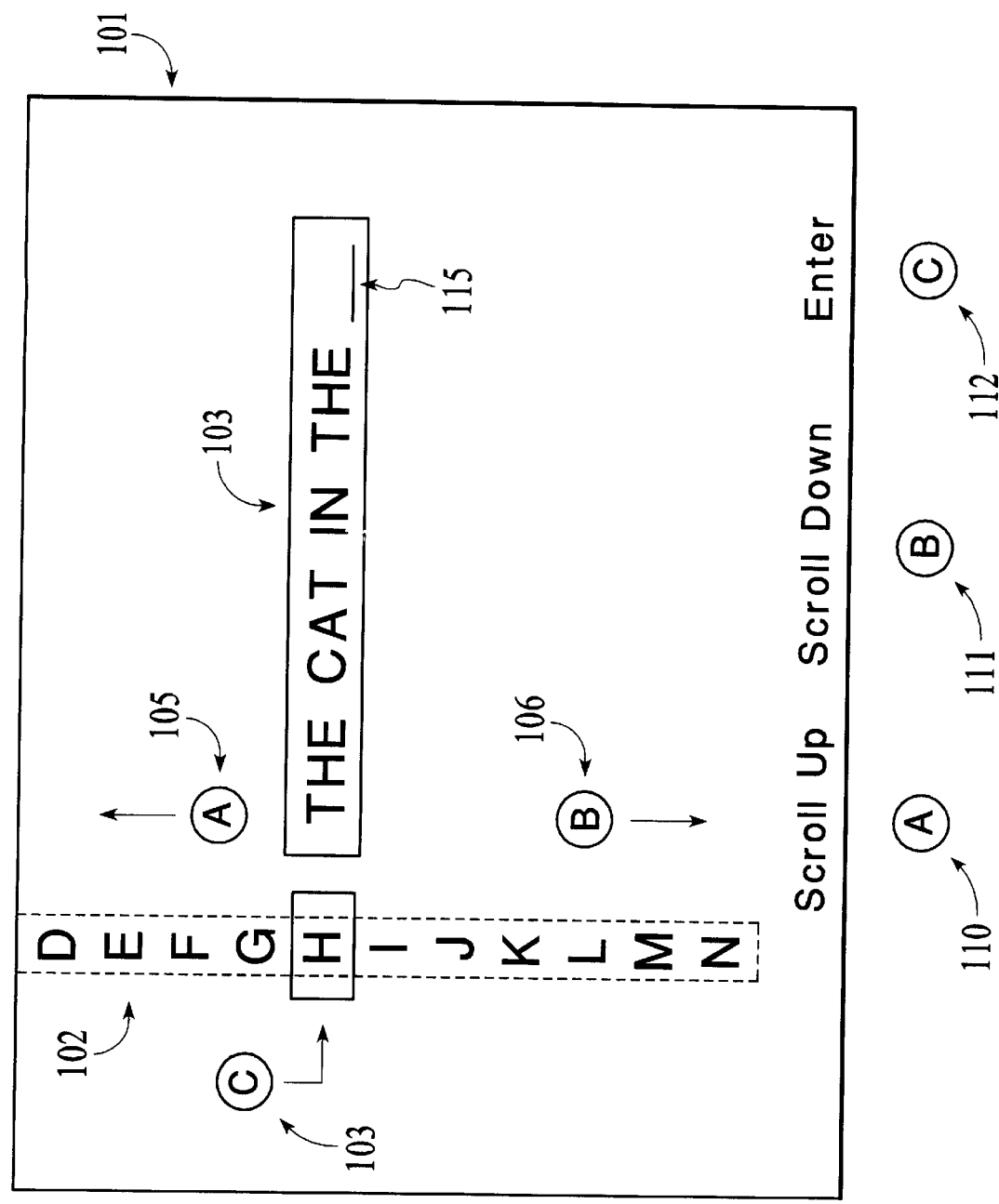
FIG. 1A shows a exemplary prior art selection wheel text entry display.
Figure 1B:
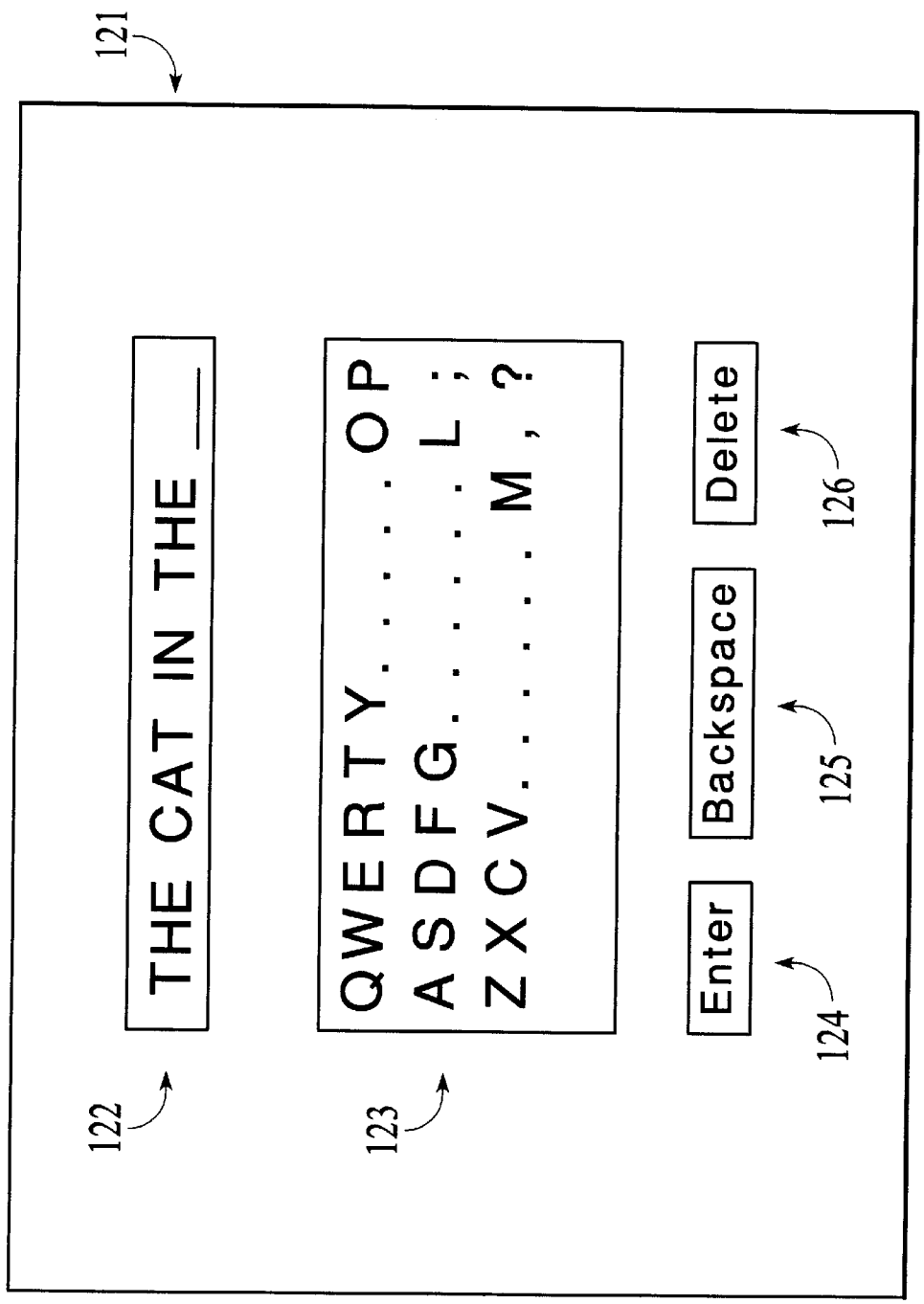
FIG. 1B shows an exemplary prior art touch screen and keyboard text entry display.
Figure 2A:
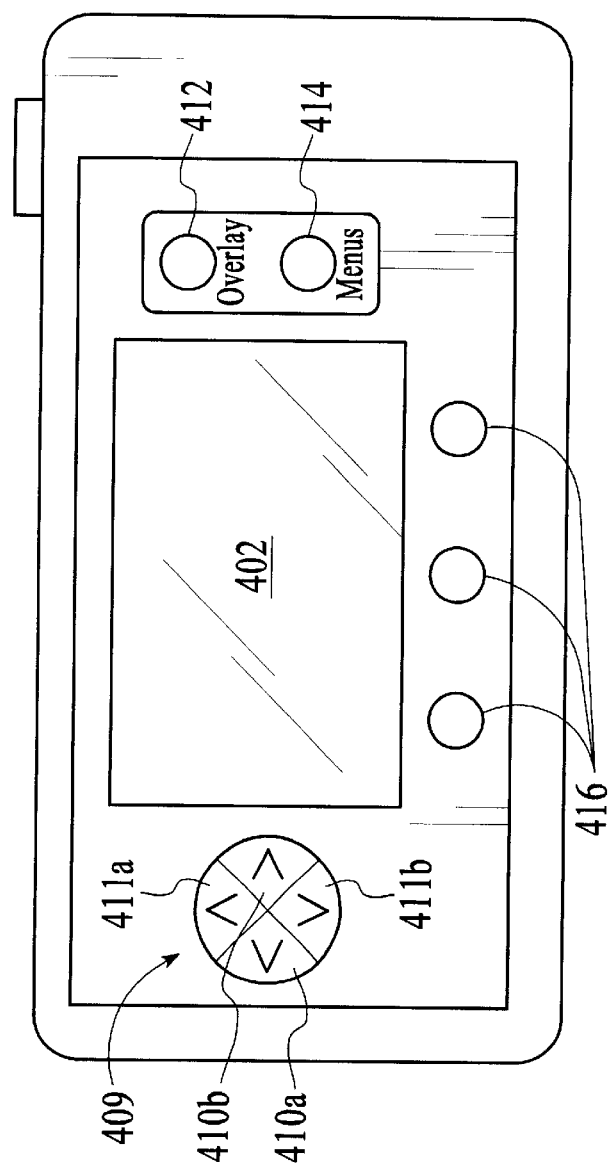
FIG. 2A shows a back view diagram depicting a LCD-screen of a digital camera in accordance with one embodiment of the present invention.
Figure 2B:
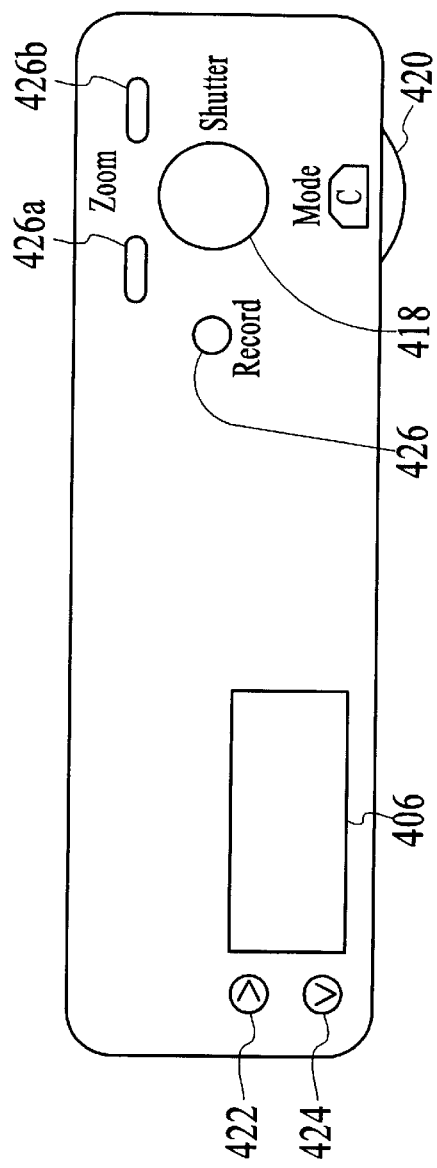
FIG. 2B shows a top view diagram depicting a status LCD and button components of a digital camera in accordance with one embodiment of the present invention.

FIGS. 2A and 2B are diagrams depicting the hardware components of a digital camera 210 in accordance with one implementation of the present invention. FIG. 2A is back view of the camera 210 showing the LCD screen 402, a four-way navigation control button 409, an overlay button 412, a menu button 414, and a set of programmable soft keys 416. FIG. 2B is a top view of the camera 210 showing a shutter button 418, and a mode dial 420. The camera may optionally include status LCD 406, status LCD scroll and select buttons 422 and 424, a sound record button 426, and zoom-in, zoom-out buttons 426a and 426b. These buttons (e.g., four-way navigation control button 409, overlay button 412, menu button 414, and programmable soft keys 416), in conjunction with LCD screen 402, allow a user to interact and interface with camera 210.

The user interface of camera 210 provides several different operating modes for supporting various camera functions. Such modes include, for example, capture mode or record mode for capturing images, and play mode for playing back the captured images on the LCD screen 402. For example, to take a picture, the user places camera 210 into capture mode by manipulating the appropriate components of camera 210's interface (e.g., turning mode dial to "c" for capture and pressing the shutter button 418). If the LCD screen 402 is activated, then the camera aids the user in preparing to capture an image by displaying a "live view" of the object viewed through the camera lens on the LCD screen 402 as a successive series of real-time frames. If the LCD screen 402 is not activated, then the user may capture an image using a conventional optical viewfinder (not shown).

Much of the functionality of the digital camera by is implemented by software (e.g., function procedures, operate system routines, hardware interfaces, etc.) executing on an embedded computer system platform built into camera 210. This software implements the functionality required for interfacing with the user via the components of the button interface of camera 210 (e.g., LCD screen 402, four-way navigation control button 409, overlay button 412, menu button 414, and programmable soft keys 416). Through manipulation of these components, the user is able to accomplish particular IO requirements. This includes the user interacting with the functionality of camera 210 by, for example, changing modes, selecting images, entering text, or the like.

Figure 2C:
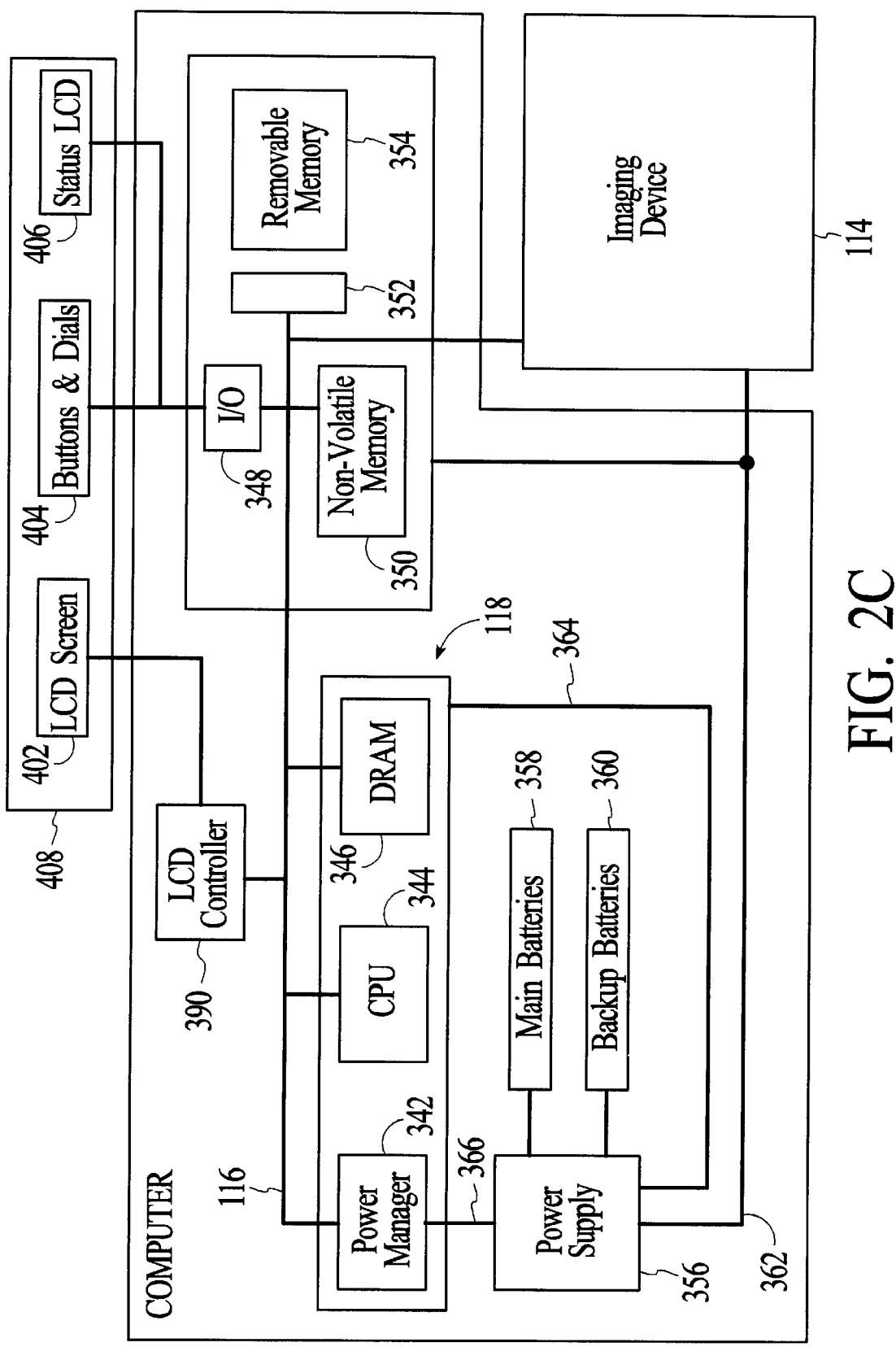
FIG. 2C shows a block diagram of an embedded computer system in accordance with one preferred embodiment of the present invention.

Referring now to FIG. 2C, a block diagram of the embedded computer system built into touch-screen camera 210 is shown. Camera 210 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional processor device for controlling the operation of camera 210. In the preferred embodiment, CPU 344 is capable of concurrently running multiple software routines to control the various processes of camera 210 within a multithreaded environment. For example, images may be captured at the same time that previously captured images are processed in the background to effectively increase the capture rate of the camera. In a preferred embodiment, CPU 244 runs an operating system capable of providing a menu-driven GUI and software image processing. An example of such software is the Digita™ Operating Environment by FlashPoint Technology of San Jose, Calif.

I/O 348 is an interface device allowing communications to and from computer 118. I/O 348 manages the user interface components 408 to interact with the user and accomplish I/O with external devices. For example, I/O 348 permits an external host computer (not shown) to connect to and communicate with computer 118. I/O 348 also interfaces with LCD screen 402, buttons and dials 404, and with a status LCD 406 to implement the GUI (graphical user interface) for the user.

Non-volatile memory 350, which may typically comprise a conventional read-only memory or flash memory, stores a set of computer-readable program instructions to control the operation of camera 210. Removable memory 354 serves as an additional image data storage area and is preferably a non-volatile device, such a flash disk, readily removable and replaceable by a camera 210 user via buffers/connector 352.

Power supply 356 supplies operating power to the various components of camera 210. Power manager 342 communicates via line 366 with power supply 356 and coordinates power management operations for camera 210. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 210 user may also connect power supply 356 to an external power source. During normal operation of power supply 356, the main batteries 358 provide operating power to power supply 356 which then provides the operating power to camera 210 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 210.

Dynamic Random Access Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers within DRAM 346. Once the raw image data is processed, it is stored in a frame buffer within DRAM 346 for display on the touch screen 502. Finally, display controller 390 accesses DRAM 346 and transfers processed image data to LCD screen 402 for display. Software code implementing the functionality of the present invention is instantiated and executed primarily from DRAM 346.

Figure 3:
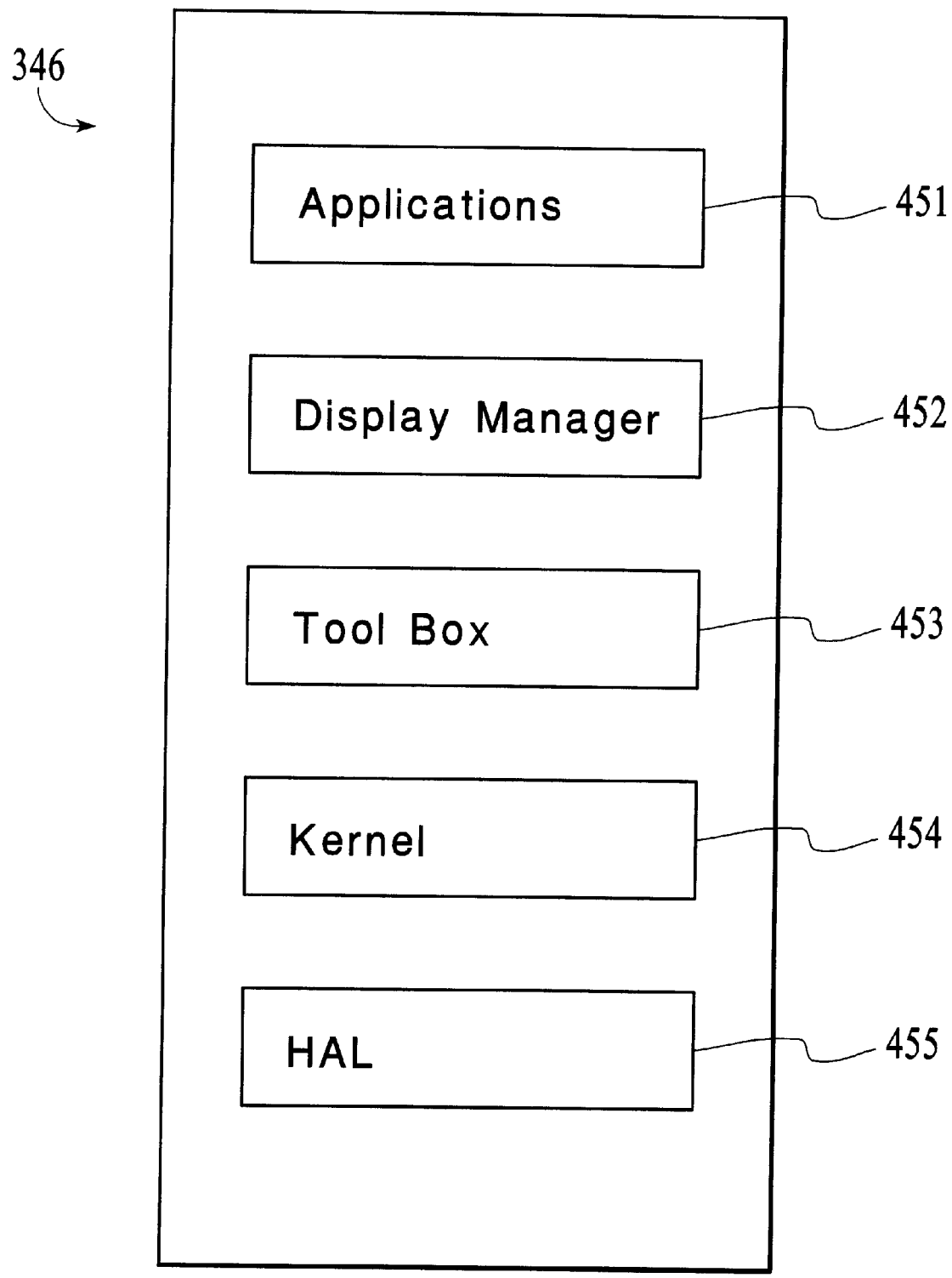
FIG. 3 shows a memory diagram of software within a DRAM of the digital camera in accordance with one embodiment of the present invention.

Referring now to FIG. 3, a memory diagram of software within DRAM 346 is shown. As depicted in FIG. 3, DRAM 346 includes software instantiations of applications 451, display manager 452, tool box 453, an operating system kernel 454, and a HAL (hardware abstraction layer) 453.

Applications 451 includes the functions and routines which implement the GUI, features, functions, and the like of camera 210. Display manager 452 includes the software procedures and routines that implement the display related aspects of the user interface of camera 210. These aspects include configuring graphical representations (e.g., text entry areas, image display areas, and the like) for display on LCD screen 402. Tool box 452 includes standardized, frequently called functions and subroutines which tend to be common across all applications. For example, the functions of tool box 452 are frequently called by applications 451 and display manager 452 to implement certain functionality. Kernel 454 includes the functions and routines of the operating system which manages and allocates the resources of the embedded computer system of camera 210 and instantiates other software functions for execution (e.g., the functions of applications 451, display manager 452, the functions of tool box 453, etc.). HAL 455 includes software for abstracting the interface characteristics of the underlying hardware of camera 210. HAL 455 abstracts the particular characteristics of the underlying hardware to provide a standardized interface to which other software can be written.

Figure 4:
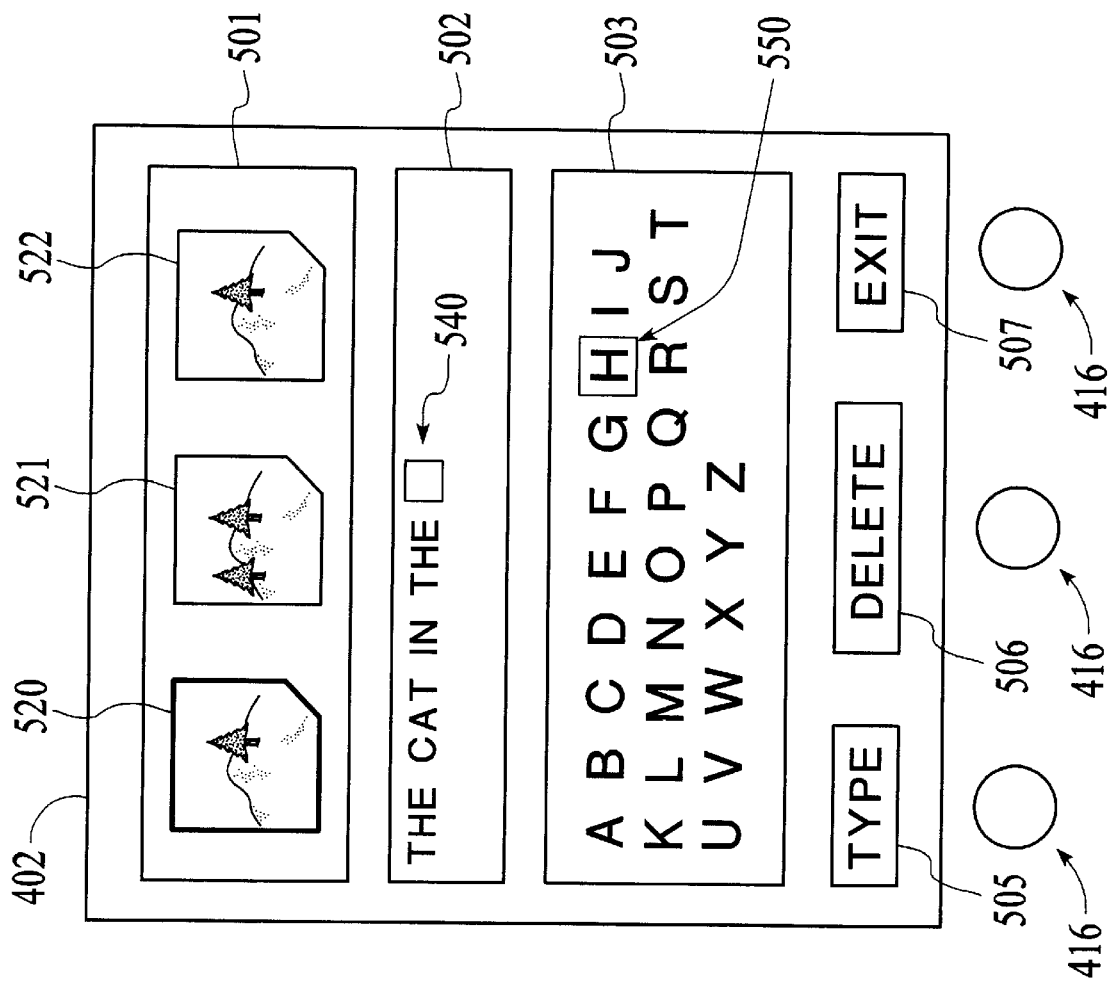
FIG. 4 shows a first diagram of the LCD screen, the four way controller, and the softkeys of a digital camera in accordance with one embodiment of the present invention.
Figure 4:
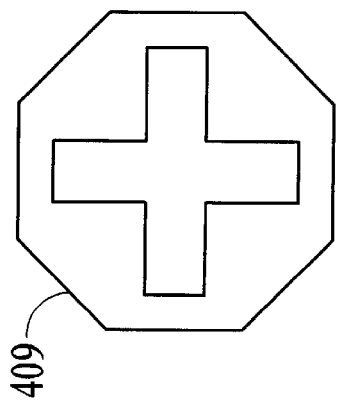

With reference now to FIG. 4, a diagram depicting the interface components 408 as used in the text entry system in accordance with one embodiment of the present invention is shown. FIG. 4 shows the LCD display 402, the four way controller 409, and the three softkeys 416. In this embodiment, three "entry areas" are graphically depicted on LCD display 402, an application area 501, a text entry area 502, and a keyboard area 503. Three functions labels, labels 505–507, are depicted above their respective corresponding softkeys 416. In this implementation, the functions "type", "delete", and "exit" are depicted by labels 505–507. In this embodiment, the functionality of the text entry method of present invention is implemented via the functions and software routines of the display manager 452 which operates in conjunction with the functionality provided by the supporting software code of tool box 453 and kernel 454.

As shown in FIG. 4, a series of images 520–522 are being displayed in application area 501. Text entry area 502 and keyboard area 503 are configured for text entry functions. A first cursor, text entry cursor 540, is displayed in order to indicate the current position for a next selected character. A second cursor, target cursor 550, is displayed within keyboard area 503 in order to indicate a character for entry into text entry area 502.

Target cursor 550 is controlled by a user via the actuation of four way controller 409. For example, as the four way controller 409 is pressed in upward direction, the cursor moves correspondingly. If the four way controller 409 is pressed in a downward (or left or right) direction, the movement of the target cursor 550 is correspondingly controlled. In this manner, target cursor 550 is used for selecting from among the various alphanumeric characters displayed within keyboard area 503.

Target cursor 550 is operable to "highlight" a currently selected alphanumeric character such that the currently selected alphanumeric character is visible and easily distinguishable to the user. This is shown in FIG. 4, where the target cursor 550 is overlaid on top of the letter "H" such that the letter "H" is highlighted (e.g., depicted as being bold).

The text entry cursor 540 indicates the location the highlighted character will occupy if that character is "typed" by the user. In the present embodiment, the user types selected characters into text entry area 502 by actuating the type softkey 506. Hence, as shown by FIG. 4, if the user were to actuate the type softkey 506, the letter "H" would be entered into the text entry area 502 and appear at the location of the text entry cursor 540. The shown in FIG. 5, where the letter "H" has been entered into text entry area 502 and the text entry cursor 540 has scrolled right to the next entry position.

In accordance with the present invention, the user controls the movement of the text entry cursor 540 and the target cursor 550 through the four way controller 409. This task is made far more intuitive for the user through the implementation of persistence between the three entry areas 501–503 of LCD display 402. Using four way controller 409, the user is able to move the target cursor 550 from one entry area to other areas while retaining persistence of the previously highlighted character or element from which the target cursor was moved. This persistence a shown in FIG. 5, where the target cursor 550 is moved from a character in the keyboard area 503 to the type softkey 506. The following discussions of FIGS. 4–8 provide examples of this persistence and the operation of the user interface 408 as manipulated by a user in order to illustrate aspects of the text entry process of the present invention. It should be appreciated however, that although described in the context of the user interacting with certain specific controls of one embodiment of a digital camera (e.g., camera 210), various modifications to the interaction sequences and controls of the preferred embodiment will be readily apparent to those skilled in the art and the generic principles described herein may be applied to other embodiments.

Figure 5:
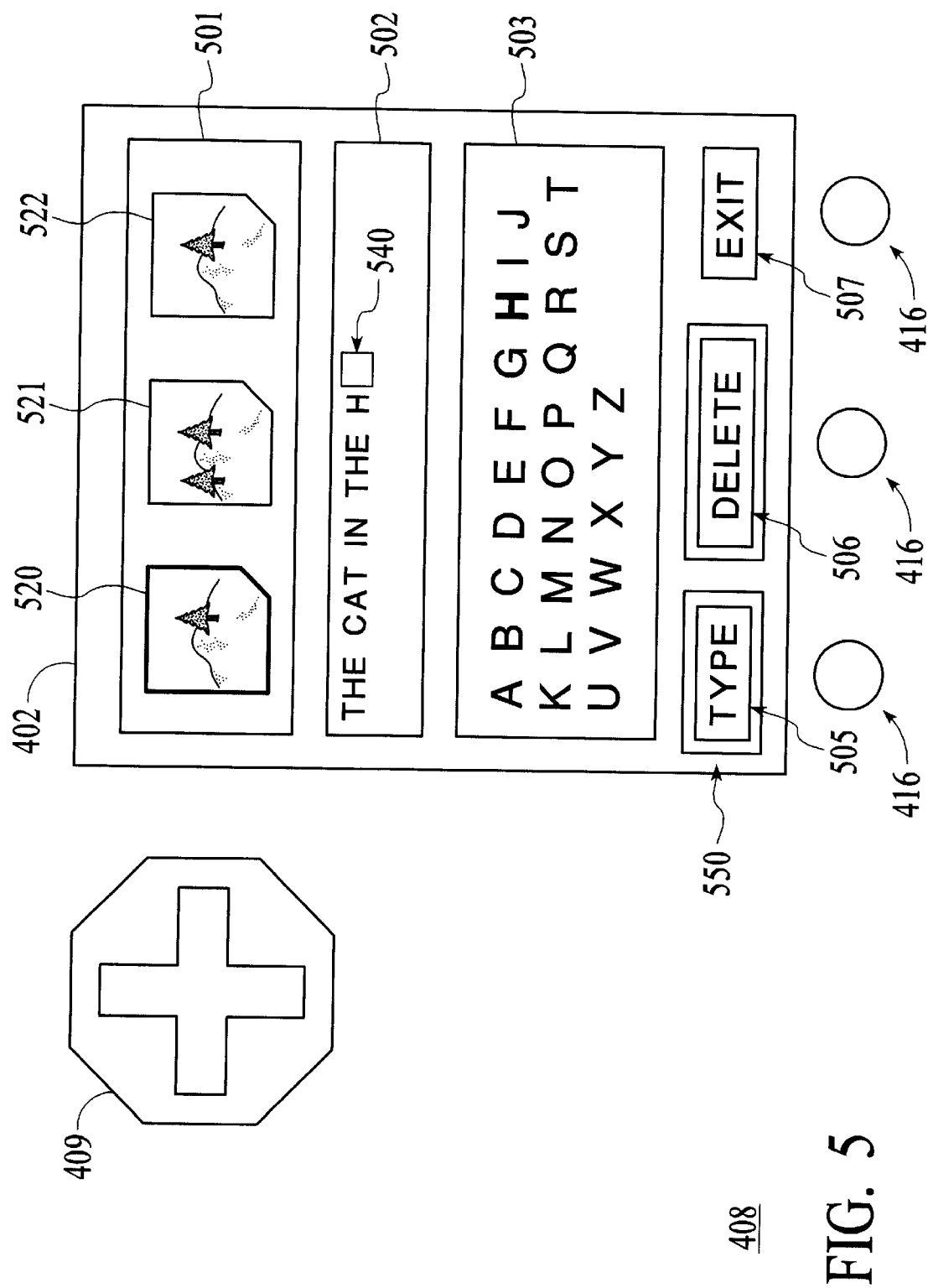
FIG. 5 shows a second diagram of the LCD screen, the four way controller, and the softkeys of a digital camera in accordance with one embodiment of the present invention.

Referring now to FIG. 5, the target cursor 550 is shown now being overlaid on top of the type softkey 505. To enter the character "H" from the keyboard area 503 into the text entry area 502 at the position of the text entry cursor 540, the user presses the type softkey button 416.

Figure 6:
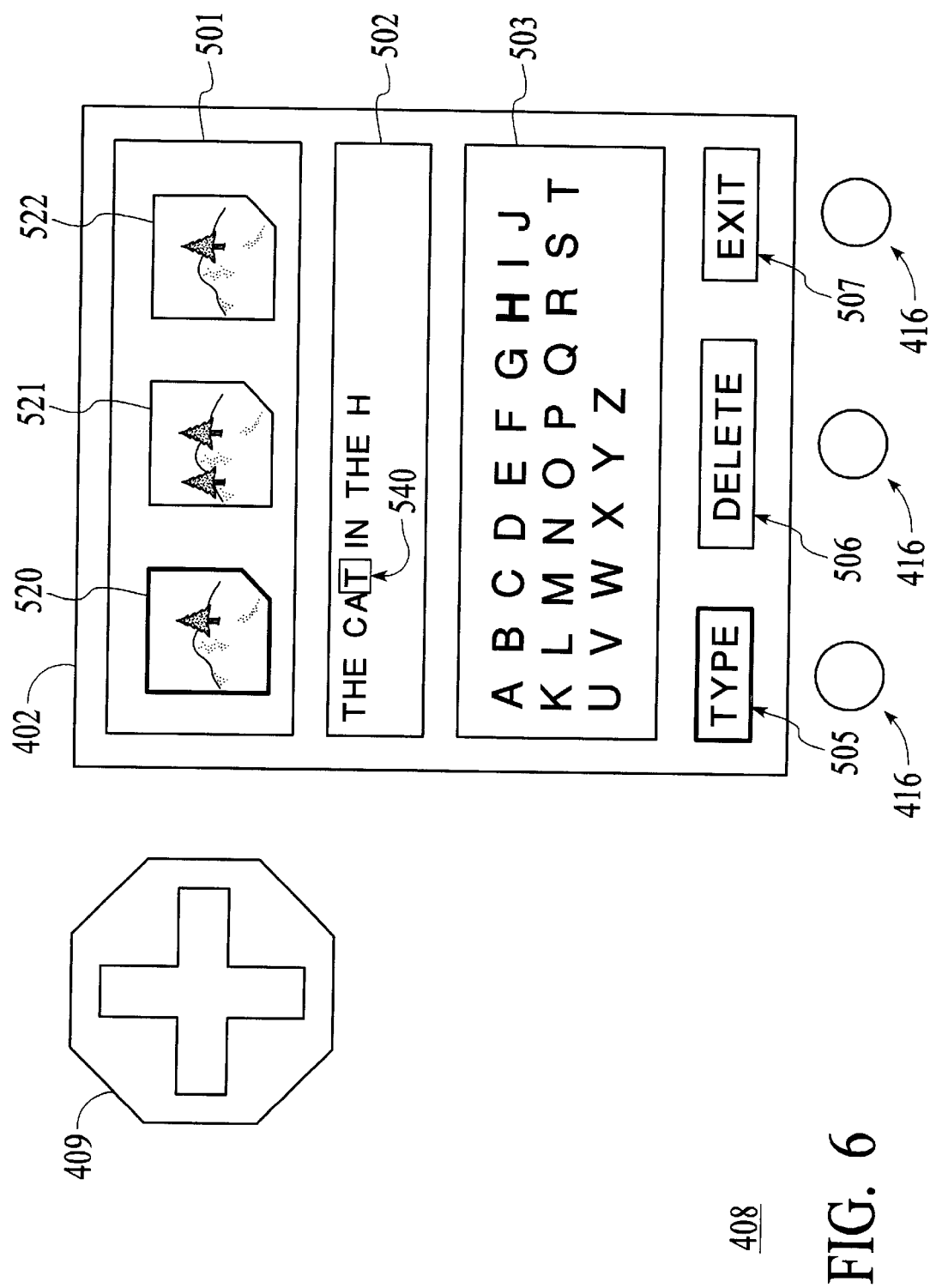
FIG. 6 shows a third diagram of the LCD screen, the four way controller, and the softkeys of a digital camera in accordance with one embodiment of the present invention.

Referring to FIG. 6, the user has moved the target cursor 550 into the text entry area 502 using four way controller 409. In this embodiment, when target cursor 550 is within the text entry area 502, the text entry cursor 540 and the target cursor 550 become one in the same. This allows the user to move the position of the target cursor/text entry cursor 540 using the same four way controller 409. As shown in FIG. 6, the user has moved the target cursor/text entry cursor 540 to the left such that it overlays a different character. The persistence of the present invention reminds the user that the type softkey 505 has been changed to "overwrite" mode and that the character "H" remains highlighted within keyboard area 503.

Figure 7:
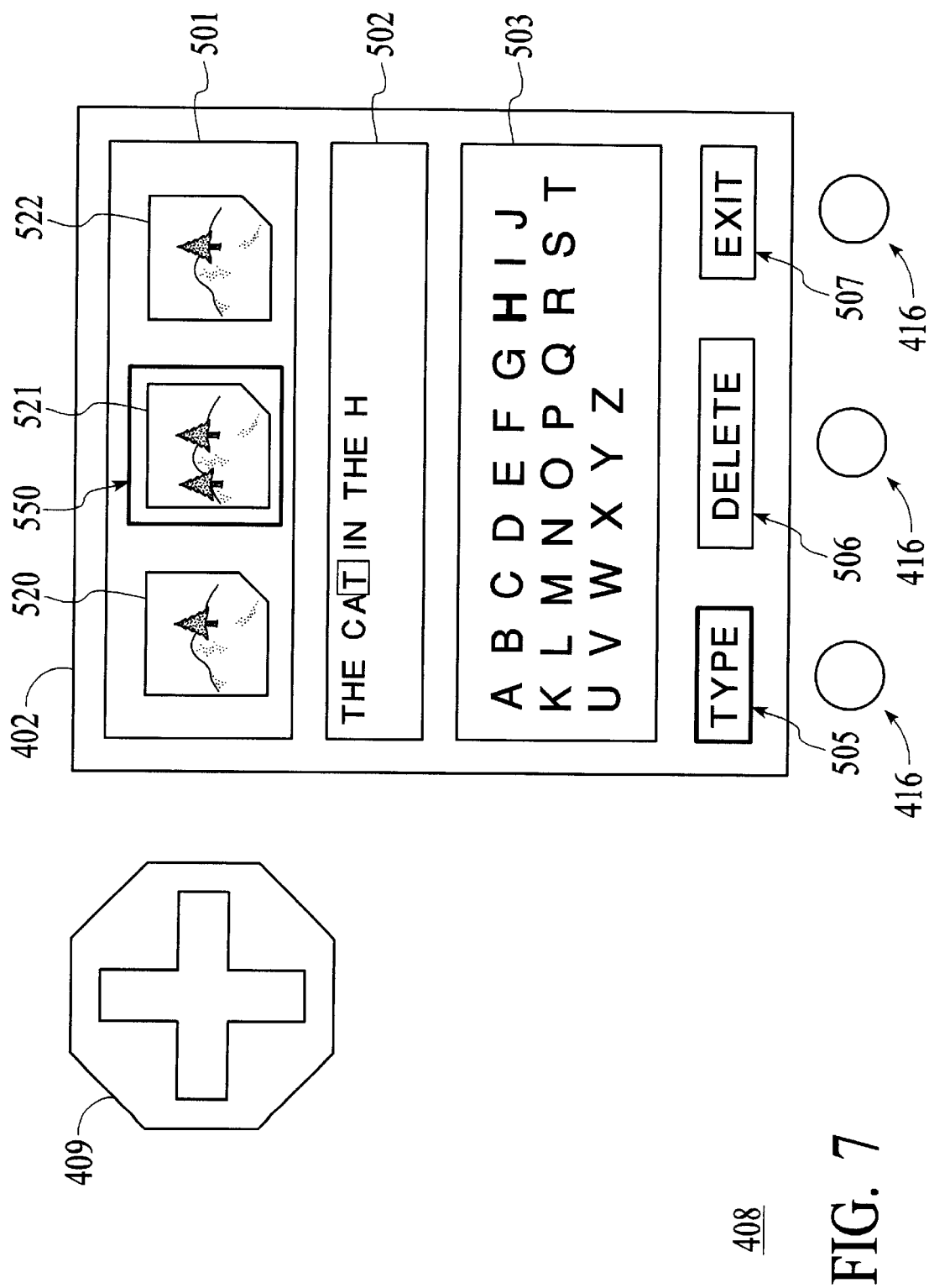
FIG. 7 shows a fourth diagram of the LCD screen, the four way controller, and the softkeys of a digital camera in accordance with one embodiment of the present invention.

As shown in FIG. 7, the user has moved the target cursor 550 from the text entry area 502 into application area 501, and overlays a target cursor over image 521. In this embodiment, this has the effect of making image 521 the currently "highlighted" image as opposed to image 520, which as shown in FIGS. 4–6 was the previously highlighted image (e.g., shown as being outlined in bold). This allows the user to select any particular one of images 520 through 522 for labeling, by for example, entering descriptive comments in text entry area 502. In addition to the images 520–522, it should be noted that the user is able to horizontally scroll additional images into the application area 501 from the left or right side.

As shown in FIG. 7, the persistence reminds the user of the current text entry cursor location, the currently highlighted character, and the particular mode of the type softkey. Thus, the user can now move target cursor 550 back into keyboard area 503 and overwrite a portion of the text displayed in text entry area 502 with new text for a new description of image 521, all while using a single four way controller 409. This is shown in FIG. 8, where the user has entered in new descriptive text for image 521.

Figure 8:
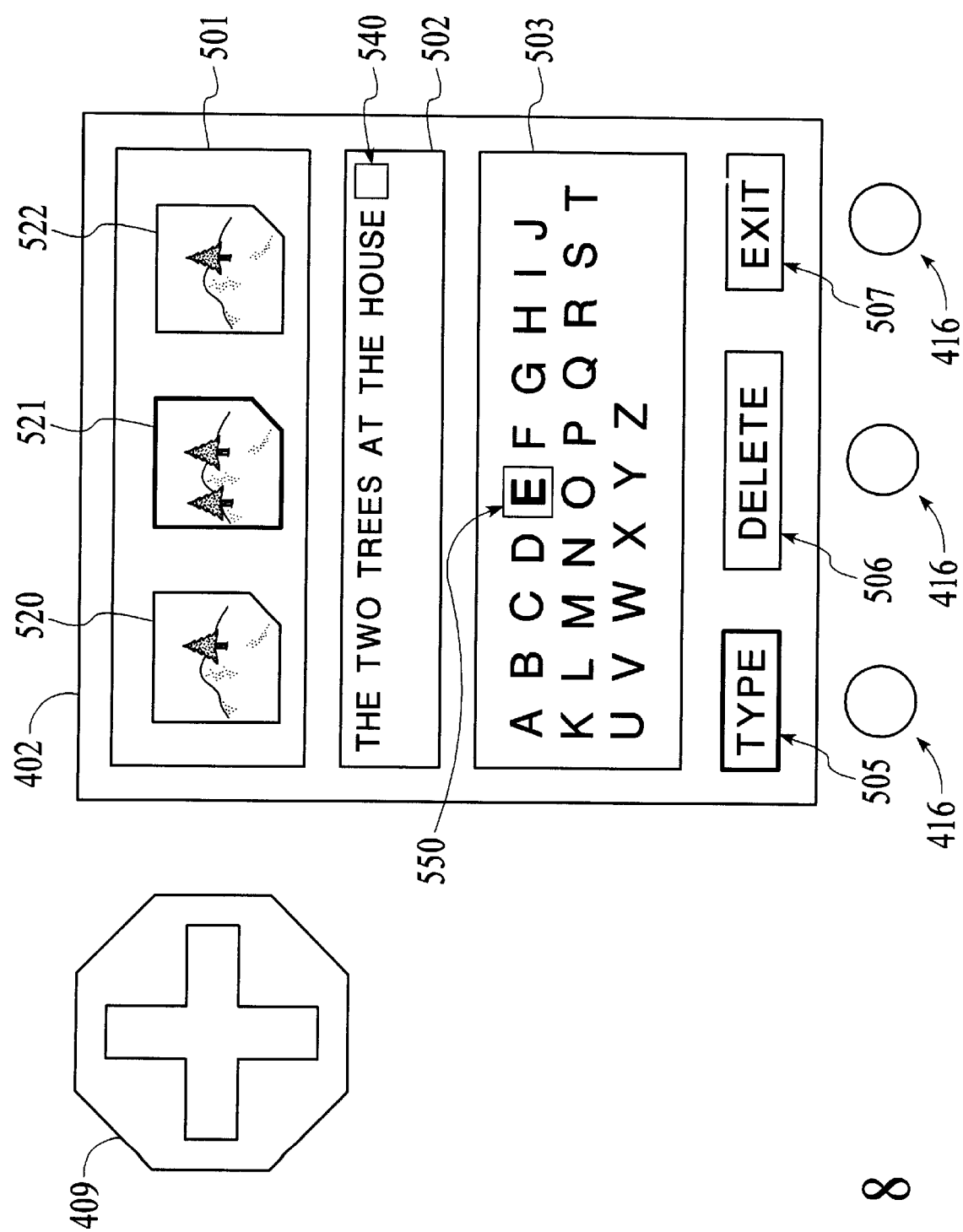
FIG. 8 shows a fifth diagram of the LCD screen, the four way controller, and the softkeys of a digital camera in accordance with one embodiment of the present invention.

Referring now to FIG. 8, using four way controller 409, the user moves target cursor 550 among the characters of keyboard area 503, selecting characters and entering them via actuating the type softkey 505. Each entered character overwrites the previously entered character in text entry area 502, as the user sequentially enters his desired comments. Each entered character sequentially scrolls the text entry cursor 540 incrementally to the right as entered by the user, with each entered character occupying the instant location of the text entry cursor 540. As shown in FIG. 8, the selection of image 521 remains persistent, the alteration of the mode (e.g., from "insert" to "overwrite") of type softkey 505 remains persistent, and the most recent highlighted character (e.g., the letter "E") remains persistent. Once the editing is finished, the user can exit the text entry mode using the exit softkey 505, delete portions of the entered text using the delete softkey 507, or otherwise alter the entered text by, for example, overwriting the text again, inserting new text, or the like.

Figure 9:
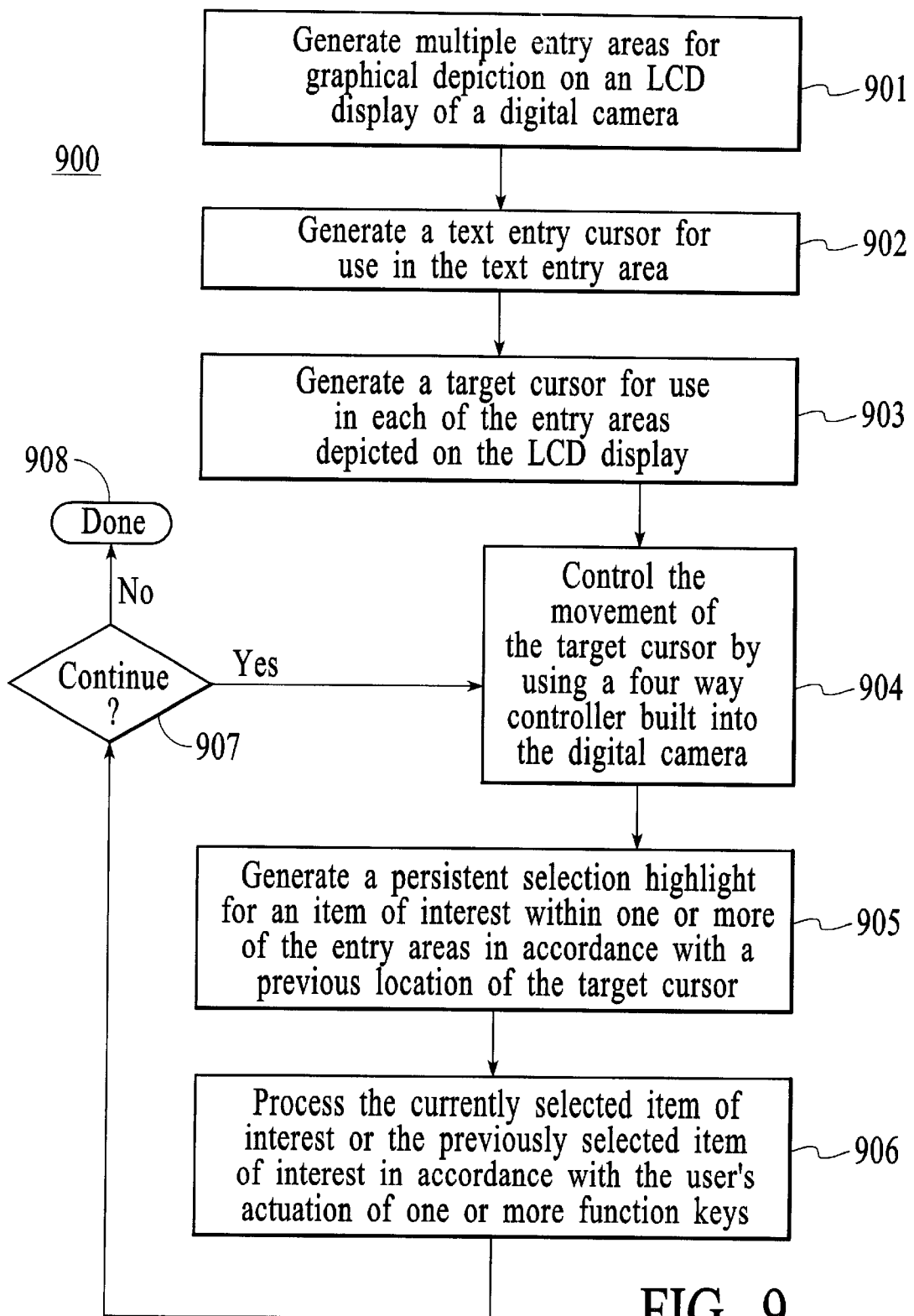
FIG. 9 shows a flow chart of the steps of an exemplary text entry process in accordance with one embodiment of the present invention.

With reference now to FIG. 9, a flow chart of an operating process 900 in accordance with one embodiment of the present invention is shown. Process 900 shows the steps involved in implementing an exemplary text entry process on a digital camera (e.g., camera 210).

Process 900 begins in step 901, where a display manager (e.g., display manager 452 shown in FIG. 3) of a digital camera generates multiple entry areas for graphical depiction on an LCD screen (e.g., LCD screen 402 shown in FIG. 4) of the camera. As described above, depending upon the particular application, the entry areas are tailored to the particular needs of the user. For example, as described above in the discussions of FIGS. 4–8, to label individual images stored within the digital camera with descriptive text, the display manager implements and application area (e.g., application area 501) which displays the various individual images, a text entry area (e.g., text entry area 502) which displays the text being entered, and a keyboard area (e.g., keyboard area 503) where the characters are selected for entry. The particular items of interest displayed in any given area can change in line with the requirements of the user.

In step 902, the display manager generates a text entry cursor (e.g., text entry cursor 540) for use within a text entry area on the LCD screen. In step 903 to display manager generates a target cursor (e.g., target cursor 540) for use in each of the entry areas depicted on the LCD screen. As described above, the target cursor can be moved to any of the entry areas displayed. In step 904, the movement of the target cursor is controlled by the movement of a four way controller (e.g., four way controller 409) built into the digital camera. The movement of the target cursor directly corresponds to the actuation of the four way controller by the user.

In step 905 a persistent selection highlight for an item of interest within one or more of the entry areas is implemented to provide a visual cue of that item to the user. As described above, through implementation of this persistent highlight, the user is able to move the target cursor from one entry area to other areas while retaining the persistence of the previously highlighted character, element, or other item of interest from which the target cursor was moved. The previously highlighted character, element, or item of interest remains persistently highlighted, thereby providing a visual cue to the user, for example, providing a convenient progress reminder to the user when engaged in a multistep editing process. In step 906, the currently selected item, or the previously selected item(s) is processed in accordance with the user's actuation of one or more function keys displayed on the LCD screen. Then, in step 907, process 900 continues, where, for example, the user enters successive characters of text by controlling the cursors with the four way controller and the function keys, or process 900 finishes, where, for example, the text entry editing is complete.

Figure 10:
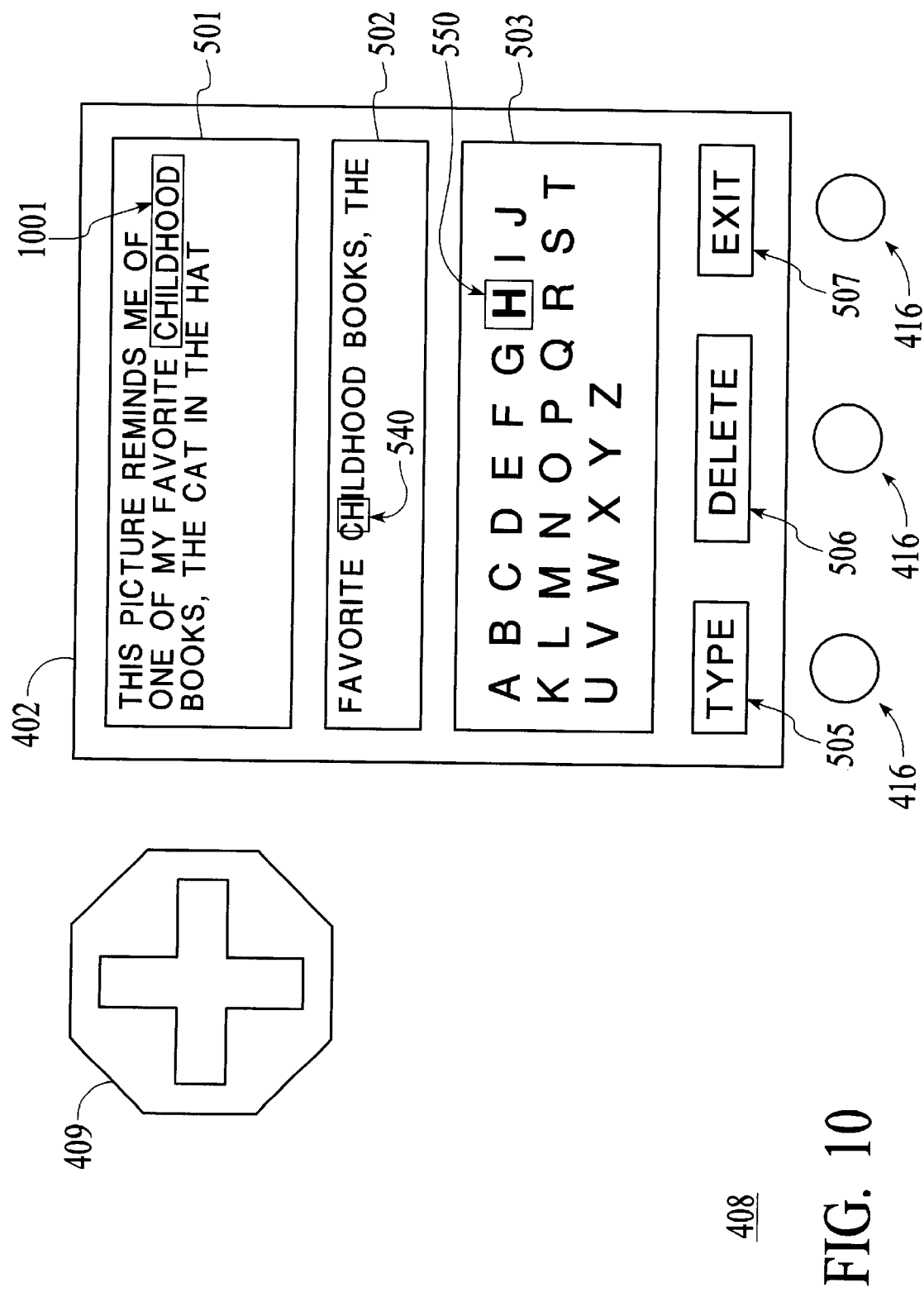
FIG. 10 shows a diagram depicting the interface components as used in a "paragraph text entry mode" in accordance with one embodiment of the present invention.

Referring now to FIG. 10, a diagram depicting the interface components 408 as used in a "paragraph text entry mode" in accordance with one embodiment of the present invention is shown. As with FIG. 4, FIG. 10 shows the LCD display 402, the four way controller 409, and the three softkeys 416. The three entry areas 501–503 are graphically depicted on LCD display 402. However, in accordance with the paragraph text entry mode, the application area 501 is used to display a region of text (e.g., a paragraph) being edited. Text entry area 502, keyboard area 503, and the functions labels 505–507 are substantially similar in appearance and function as described in the discussions of FIGS. 4–8 above. As with the above examples, the functions "type", "delete", and "exit" are depicted by labels 505–507.

In this embodiment, the paragraph text entry mode, the functionality of the text entry method of present invention is augmented by the simultaneous display of a large region of text in the application area 501 as opposed to other items of interest, such as pictures. This mode provides increased utility for the entry and editing of large amount of text, as is typically done by a user in conjunction with, for example, an Email application.

As shown in FIG. 10, application area 501 displays a region of text that is currently being edited. Text entry area 502 shows one or more lines of text that is currently being edited. The text displayed in text entry area 502 is the same as the text displayed in application area 501. Text entry area 502 is focused on the particular character being edited, as shown by text cursor 540. Application area 501 is focused on the particular word being edited, as shown by word cursor 1001. The areas 501 and 502 are configured such that the word being edited in text entry area 502 (as shown by the location of text entry cursor 540) corresponds to the word highlighted in the application area 501 (as shown by the location of word cursor 1001). Hence, as the text entry cursor 540 is moved by the user from the characters of one word to the characters of another, word cursor 1001 moves correspondingly from one word to another, such that the current word being edited is always highlighted by word cursor 1001. With text entry area 502, the user's attention is focused on the particular character being edited, as shown by text entry cursor 540. With application area 501, the user's attention is focused on the particular word being edited, as shown by word cursor 1001.

Referring still to FIG. 10, movement of the text entry cursor is controlled by the four way controller 409, as described in the discussions above. The text entry cursor 540 moves up, down, left, and right in response to the actuation of four way controller 409. Additionally, the user can move the target cursor 550 into application area 501, where it becomes word cursor 1001, and use four way controller 409 to select successive words displayed application area 501.

Persistence is implemented in substantially the same manner as described in the discussions of FIGS. 4–8. For example, a word selected in application area 501 remains persistently selected as individual characters of the word are edited in text entry area 502, as depicted in FIG. 10. Individual characters are selected by four way controller 409 from the characters displayed on the keyboard area 503. In accordance with particular implementations, persistence of highlight for each of the cursors 550, 540, and 1001 can be implemented. As with the previous examples described above, the functions and descriptions of labels 505–507 and softkeys 416 can change depending upon which of areas 501–503 the target cursor 550 is currently within. For example, when target cursor 550 is in keyboard area 503, character level commands can be shown on labels 505–507, while when target cursor 550 is in text entry area 502 or application area 501, additional character level commands or word level commands can be shown.

The advantages provided by the paragraph text entry mode of the present invention included the fact that far fewer clicks or actuations of four way controller 409 are required to move around within and edit lengthy documents in comparison to prior art text entry techniques. The paragraph text entry mode provides a navigation means based upon words as opposed to individual characters. Thus, the user is able to navigate and move around a lengthy text entry (e.g., an Email message) much faster. Persistence of selection provides intuitive clues to the user as the capabilities of the multiple areas are exploited. Efficiency and ease of use is maintained, no touch screen is required, and no stylus or mouse is required.

Thus, the present invention implements an efficient alphanumeric text entry interface for portable digital electronic devices, by implementing a keyboard metaphor for text entry and eliminating the requirement for a separate stylus and an expensive touch screen, as used in several prior art devices. The text entry method of the present invention is intuitive and efficient for entering substantial amounts of text. This greatly aids the utility of small handheld electronic devices, where the available space for implementing a user interface is limited. The system is powerful, efficient, and user-friendly, allowing a user to efficiently enter substantial amounts of text into a small handheld electronic device, such as, for example, a digital camera, that does not include a keyboard, mouse, stylus, or touch screen, or the like.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for implementing an efficient alphanumeric text entry interface for a portable digital imaging device, the method comprising the steps of:

a) generating a first entry area and a second entry area on a display built into a digital imaging device, the first entry area and the second entry area for displaying alphanumeric characters;

b) generating a cursor for selecting alphanumeric characters displayed in the first area and the second area, wherein the cursor is operable to highlight a currently selected alphanumeric character such that the currently selected alphanumeric character is visible to the user;

c) controlling the movement of the cursor with a four way controller built into the digital imaging device, the four way controller adapted for manipulation by a user, wherein the four way controller is operable to move the cursor between the first area and the second area, the four way controller also operable to move the cursor among alphanumeric characters within the first area or the second area;

d) generating a persistent selection highlight for an alphanumeric character previously selected by the cursor, such that as the cursor is moved between the first area the second area, the previously selected alphanumeric character remains visible to the user; and e) processing the currently selected alphanumeric character or the previously selected alphanumeric character in accordance with the user actuating of an input control built into the digital imaging device.

2. The method of claim 1, wherein the first entry area is a text entry area operable for displaying alphanumeric text to the user and the second entry area is a operable for displaying alphanumeric characters, including all the letters of the alphabet, for selection by the user.

3. The method of claim 1, further including the step of:

f) generating a third entry area for displaying application specific items to the user.

4. The method of claim 3, wherein the third entry area is an application area for displaying captured digital images stored within the digital imaging device.

5. The method of claim 1, wherein the first entry area, the second entry area, and the cursor are generated by a display manager, the display manager configured to control the interaction of the first entry area, the second entry area, and the cursor with the user to implement a user interface, the input control being a softkey.

6. The method of claim 1, wherein the cursor is a target cursor operable to highlight an alphanumeric character within the first entry area or the second entry area to create a currently highlighted alphanumeric character.

7. The method of claim 6, wherein the currently highlighted alphanumeric character becomes the previously selected alphanumeric character when the target cursor is moved between the first entry area and the second entry area, the persistent selection highlight subsequently being generated for the previously selected alphanumeric character.

8. The method of claim 1, wherein step e) further includes entering the previously selected alphanumeric character or the currently selected alphanumeric character into the first entry area with the actuating of the input control by the user.

9. A method for implementing an efficient alphanumeric text entry interface for a portable digital electronic device, the method implemented by software executing on an embedded computer system built into the digital electronic device, the method comprising the computer implemented steps of:
   a) generating a first entry area and a second entry area on a display of a digital electronic device, the first area and the second area for displaying alphanumeric characters;
   b) generating a cursor for selecting alphanumeric characters displayed in the first area and the second area, wherein the cursor is operable to highlight a currently selected alphanumeric character such that the currently selected alphanumeric character is visible to the user;
   c) controlling the movement of the cursor with a four way controller built into the digital electronic device, the four way controller adapted for manipulation by a user, wherein the four way controller is operable to move the cursor between the first area and the second area, the four way controller also operable to move the cursor among alphanumeric characters within the first area and the second area;
   d) generating a persistent selection highlight for an alphanumeric character previously selected by the cursor, such that as the cursor is moved between the first area the second area, the previously selected alphanumeric character remains visible to the user; and
   e) processing the currently selected alphanumeric character or the previously selected alphanumeric character in accordance with the user actuating of an input control built into the digital electronic device.

10. The method of claim 9, wherein the first entry area is a text entry area operable for displaying alphanumeric text to the user and the second entry area is operable for displaying alphanumeric characters, including all the letters of the alphabet, for selection by the user.

11. The method of claim 9, further including the step of:
   f) generating a third entry area for displaying application specific items to the user.

12. The method of claim 11, wherein the third entry area is an application area for displaying application specific items of interest stored within the digital electronic device.

13. The method of claim 9, wherein the first entry area, the second entry area, and the cursor are generated by a display manager, the display manager configured to control the interaction of the first entry area, the second entry area, and the cursor with the user to implement a user interface, and wherein the input control is a softkey.

14. The method of claim 9, wherein the cursor is a target cursor operable to highlight an alphanumeric character within the first entry area or the second entry area to create a currently highlighted alphanumeric character.

15. The method of claim 14, wherein the currently highlighted alphanumeric character becomes the previously selected alphanumeric character when the target cursor is moved between the first entry area and the second entry area, the persistent selection highlight subsequently being generated for the previously selected alphanumeric character.

16. The method of claim 9, wherein step e) further includes entering the previously selected alphanumeric character or the currently selected alphanumeric character into the first entry area with the actuating of the input control.

17. A system for implementing an efficient alphanumeric text entry interface for a portable digital imaging device, comprising:
   an LCD (liquid crystal display) coupled to the digital imaging device for displaying graphical information to a user;
   a four way controller built into the digital imaging device for accepting input from the user; and
   an embedded computer system built into the digital imaging device, the computer system having a processor coupled to a memory, the memory storing computer readable code which when executed by the processor cause the computer system to implement:
      a first entry area and a second entry area on the LCD, the first and second areas configured to display alphanumeric characters;
      a cursor for selecting alphanumeric characters displayed in the first area and the second area, wherein the cursor is operable to highlight a currently selected alphanumeric character such that the currently selected alphanumeric character is visible to the user, wherein the movement of the cursor is controlled by the four way controller, the four way controller operable to move the cursor between the first area and the second area, the four way controller also operable to move the cursor among alphanumeric characters within the first area and the second area;
      a persistent selection highlight for an alphanumeric character previously selected by the cursor, such that as the cursor is moved between the first area the second area, the previously selected alphanumeric character remains visible to the user to enable processing the currently selected alphanumeric character or the previously selected alphanumeric character in accordance with the user actuating of an input control built into the digital imaging device.

18. The system of claim 17, wherein the first entry area is a text entry area operable for displaying alphanumeric text to the user and the second entry area is operable for displaying alphanumeric characters, including all the letters of the alphabet, for selection by the user.

19. The system of claim 17, further including a third entry area for displaying application specific items to the user.

20. The system of claim 19, wherein the third entry area is an application area for displaying captured digital images stored within the digital imaging device.

21. The system of claim 17, wherein the first entry area, the second entry area, and the cursor are generated by a display manager, the display manager configured to control the interaction of the first entry area, the second entry area, and the cursor with the user to implement a user interface.

22. The system of claim 17, wherein the cursor is a target cursor operable to highlight an alphanumeric character within the first entry area or the second entry area to create a currently highlighted alphanumeric character.

23. The system of claim 22, wherein the currently highlighted alphanumeric character becomes the previously selected alphanumeric character when the target cursor is moved between the first entry area and the second entry area, the persistent selection highlight subsequently being generated for the previously selected alphanumeric character.

24. The system of claim 17, wherein the previously selected alphanumeric character or the currently selected alphanumeric character is entered into the first entry area with the actuating of the input control.

25. The system of claim 19, wherein the third entry area is an application area for displaying a region of alphanumeric text, wherein the alphanumeric text is concurrently edited using the first entry area.

26. The system of claim 25, wherein the third entry area includes a cursor operable for highlighting a set of alphanumeric characters displayed within said third entry area, and wherein said highlighted subset corresponds to a set of alphanumeric characters being edited within said first entry area.

27. The system of claim 26, wherein movement of the cursor operable for highlighting a set of alphanumeric characters displayed within the third entry area is controlled by the user via the four way controller.

* * * * *